(12) United States Patent
Zhou

(10) Patent No.: US 11,720,344 B2
(45) Date of Patent: Aug. 8, 2023

(54) CODE HOT-UPDATE METHOD AND DEVICE, STORAGE MEDIUM, PROCESSOR, AND TERMINAL

(71) Applicant: NETEASE (HANGZHOU) NETWORK CO., LTD., Zhejiang (CN)

(72) Inventor: Yang Zhou, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 77 days.

(21) Appl. No.: 16/981,710

(22) PCT Filed: Mar. 11, 2019

(86) PCT No.: PCT/CN2019/077642
§ 371 (c)(1),
(2) Date: Sep. 17, 2020

(87) PCT Pub. No.: WO2019/184687
PCT Pub. Date: Oct. 3, 2019

(65) Prior Publication Data
US 2021/0034356 A1 Feb. 4, 2021

(30) Foreign Application Priority Data
Mar. 29, 2018 (CN) .......................... 201810273659.2

(51) Int. Cl.
*G06F 8/656* (2018.01)
*G06F 8/41* (2018.01)
(Continued)

(52) U.S. Cl.
CPC ................ *G06F 8/656* (2018.02); *G06F 8/44* (2013.01); *G06F 9/4552* (2013.01);
(Continued)

(58) Field of Classification Search
CPC ........ G06F 8/44; G06F 9/45508; G06F 8/656; G06F 8/41; G06F 8/447; G06F 8/47;
(Continued)

(56) References Cited

U.S. PATENT DOCUMENTS 6,075,942 A * 6/2000 Cartwright, Jr. ........ G06F 8/447
717/148
9,335,986 B1 * 5/2016 Bowen ..................... G06F 8/656
(Continued)

FOREIGN PATENT DOCUMENTS

CN 1687862 A 10/2005
CN 103838614 A 6/2014
(Continued)

OTHER PUBLICATIONS

3DRepo4Unity: Dynamic loading of version controlled 3D assets into the Unity game engine, author: S Friston, published on 2017.*
(Continued)

*Primary Examiner* — Todd Aguilera
(74) *Attorney, Agent, or Firm* — Gang Yu

(57) ABSTRACT

A code hot-update method and terminal are provided. The method includes: code to be hot-updated is translated into first-type intermediate code, wherein the first-type intermediate code is compiled by using a compiler of a target-type operating system; the first-type intermediate code is translated into bytecode to be run, wherein the bytecode to be run is interpreted by an interpreter of the target-type operating system; and the bytecode to be run is interpreted by using the interpreter to hot-update the code to be hot-updated.

16 Claims, 3 Drawing Sheets

(51) Int. Cl.
*G06F 9/455* (2018.01)
*G06F 8/52* (2018.01)
*G06F 8/51* (2018.01)

(52) U.S. Cl.
CPC ............ *G06F 9/45508* (2013.01); *G06F 8/51* (2013.01); *G06F 8/52* (2013.01)

(58) Field of Classification Search
CPC ............ G06F 8/51–52; G06F 8/65–66; G06F 9/45516–4552
USPC ........................................................ 717/168
See application file for complete search history.

(56) References Cited

U.S. PATENT DOCUMENTS

| | | | | |
|---|---|---|---|---|
| 9,477,461 | B1* | 10/2016 | Korotaev | G06F 8/656 |
| 2006/0242464 | A1* | 10/2006 | Holt | G06F 8/456 |
| | | | | 714/25 |
| 2007/0061372 | A1* | 3/2007 | Appavoo | G06F 8/656 |
| 2009/0222393 | A1* | 9/2009 | Ganai | G06F 17/11 |
| | | | | 706/46 |
| 2010/0083224 | A1* | 4/2010 | Arnold | G06F 8/656 |
| | | | | 717/110 |
| 2010/0191930 | A1* | 7/2010 | Groff | G06F 8/44 |
| | | | | 711/170 |
| 2011/0066829 | A1* | 3/2011 | Tye | G06F 8/4441 |
| | | | | 712/E9.035 |
| 2011/0258616 | A1* | 10/2011 | Sollich | G06F 9/45516 |
| | | | | 717/146 |
| 2012/0096449 | A1 | 4/2012 | Yang | |
| 2012/0317394 | A1* | 12/2012 | Zhu | G06F 8/44 |
| | | | | 711/E12.001 |
| 2015/0154746 | A1* | 6/2015 | Zafar | G06T 7/0008 |
| | | | | 382/149 |
| 2015/0178054 | A1* | 6/2015 | Delsart | G06F 9/45533 |
| | | | | 717/148 |
| 2015/0355898 | A1* | 12/2015 | Zhang | G06F 9/4552 |
| | | | | 717/169 |
| 2016/0216962 | A1* | 7/2016 | Wang | G06F 8/71 |
| 2018/0276015 | A1* | 9/2018 | Yi | G06F 9/4552 |
| 2021/0294948 | A1* | 9/2021 | Choi | G06F 13/1673 |

FOREIGN PATENT DOCUMENTS

| | | |
|---|---|---|
| CN | 104182267 A | 12/2014 |
| CN | 104991793 A | 10/2015 |
| CN | 105487885 A | 4/2016 |
| CN | 106569794 A | 4/2017 |
| CN | 106663025 A | 5/2017 |
| CN | 107967139 A | 4/2018 |
| CN | 108415719 A | 8/2018 |

OTHER PUBLICATIONS

Sista: Saving optimized code in snapshots for fast start-up, author: C Béra, published on 2017.*
Efficient code generation in a region-based dynamic binary translator, author: T Spink,, published on 2014.*
Title: Trace-based just-in-time type specialization for dynamic languages, author: A Gal et al, published on 2009.*
ALONE_MONKEY, <Things you should know about LLVM>, Feb. 8, 2017.
Qiyer, <Mobile hot update solution (Ios+Android) >; from JIANSHU website; Feb. 14, 2017.
INDIEACE; <To make games with Unity, you need to learn more about IL2CPP>; from JIANSHU, May 13, 2015.

* cited by examiner

CODE HOT-UPDATE METHOD AND DEVICE, STORAGE MEDIUM, PROCESSOR, AND TERMINAL

The present application claims priority of Chinese Patent Application No. 201810273659.2, filed on Mar. 29, 2018, and named after "Code Hot-Update Method and Device, Storage Medium, Processor, and Terminal". Contents of the present disclosure are hereby incorporated by reference in entirety of the Chinese Patent Application.

TECHNICAL FIELD

The present disclosure relates to the field of computers, and in particularly to a code hot-update method and a terminal.

BACKGROUND

At present, a non-jailbroken iOS operating system may do not allow a data segment to execute permissions. It is usually necessary to convert C# code into bytecode that may be efficiently interpreted by an Advanced RISC Machines (ARM) processor to make an interpreter bypass the limitations of the iOS operating system, thereby implementing hot update of the C# code. The related art may uses scripting language LUA to implement hot update of the C# code. The most representative solution is XLUA. XLUA may add a LUA scripting ability to a C# environment such as UNITY, .Net, or Mono. With XLUA, LUA may be easily called with C#.

SUMMARY

At least one embodiment of the present disclosure provides a code hot-update method and device, a storage medium, a processor, and a terminal.

According to an aspect of the embodiments of the present disclosure, a code hot-update method is provided, which may include: code to be hot-updated is translated into first-type intermediate code, wherein the first-type intermediate code is compiled by using a compiler of a target-type operating system; the first-type intermediate code is translated into bytecode to be run, wherein the bytecode to be run is interpreted by an interpreter of the target-type operating system; and the bytecode to be run is interpreted by using the interpreter to hot-update the code to be hot-updated.

According to another aspect of the embodiments of the present disclosure, a code hot-update device is also provided, which may include: at least one processor, and at least one memory for storing at least one program element. The at least one program element may be executed by the processor. The at least one program element may include: a first translation component, configured to translate code to be hot-updated into first-type intermediate code, wherein the first-type intermediate code is compiled by using a compiler of a target-type operating system; a second translation component, configured to translate the first-type intermediate code into bytecode to be run, wherein the bytecode to be run is interpreted by an interpreter of the target-type operating system; and a hot update component, configured to interpret the bytecode to be run by using the interpreter to hot-update the code to be hot-updated.

According to another aspect of the embodiments of the present disclosure, a non-transitory storage medium is also provided, on which at least one computer program is stored, the at least one computer program being executed by a processor to implement the following steps: code to be hot-updated is translated into first-type intermediate code, wherein the first-type intermediate code is compiled by using a compiler of a target-type operating system; the first-type intermediate code is translated into bytecode to be run, wherein the bytecode to be run is interpreted by an interpreter of the target-type operating system; and the bytecode to be run is interpreted by using the interpreter to hot-update the code to be hot-updated.

According to another aspect of the embodiments of the present disclosure, a processor is also provided. The processor may be configured to run a program. The program may be run to perform the following steps: code to be hot-updated is translated into first-type intermediate code, wherein the first-type intermediate code is compiled by using a compiler of a target-type operating system; the first-type intermediate code is translated into bytecode to be run, wherein the bytecode to be run is interpreted by an interpreter of the target-type operating system; and the bytecode to be run is interpreted by using the interpreter to hot-update the code to be hot-updated.

According to another aspect of the embodiments of the present disclosure, a terminal is also provided. The terminal may include at least one memory and at least one processor. The memory stores memory may store at least one computer program. The processor may be configured to run the at least one computer program to perform the following steps: code to be hot-updated is translated into first-type intermediate code, wherein the first-type intermediate code is compiled by using a compiler of a target-type operating system; the first-type intermediate code is translated into bytecode to be run, wherein the bytecode to be run is interpreted by an interpreter of the target-type operating system; and the bytecode to be run is interpreted by using the interpreter to hot-update the code to be hot-updated.

DETAILED DESCRIPTION OF THE EMBODIMENTS

In order to make those skilled in the art better understand the solutions of the embodiments of the present disclosure, the technical solutions in the embodiments of the present disclosure will be clearly and completely described below with reference to the drawings in the embodiments of the present disclosure.

The XLUA solution may have the following disadvantages:

1. The execution efficiency is low. LUA may use dynamic types and be hardly optimized, and LUA may need to convert types when interacting with C#.

2. The development cost is high, and developers may need to write LUA and C# code at the same time.

Figure 1:
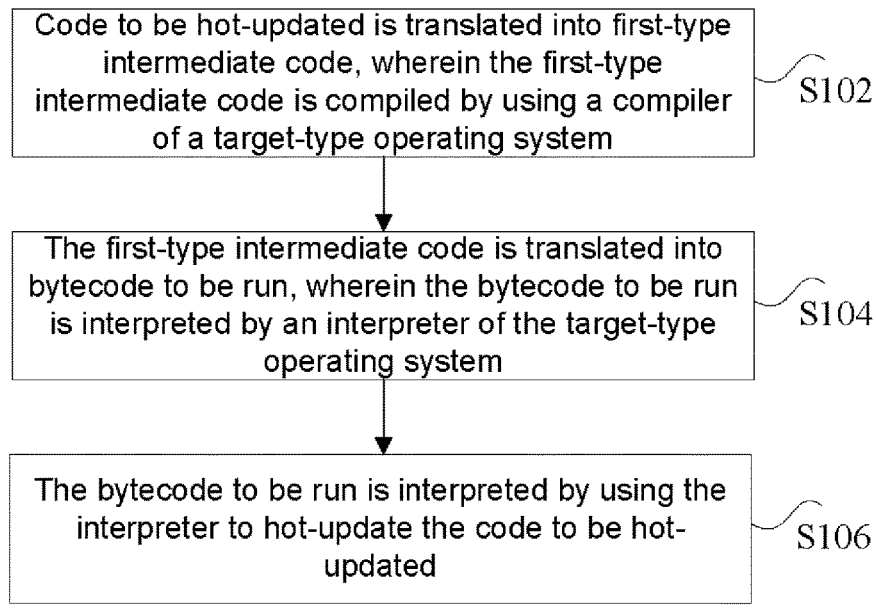
FIG. 1 is a flowchart of a code hot-update method according to one embodiment of the present disclosure.

FIG. 1 is a flowchart of a code hot-update method according to one embodiment of the present disclosure. As shown in FIG. 1, the method includes the following steps.

At step S102, code to be hot-updated is translated into first-type intermediate code, wherein the first-type intermediate code is compiled by using a compiler of a target-type operating system.

At step S104, the first-type intermediate code is translated into bytecode to be run, wherein the bytecode to be run is interpreted by an interpreter of the target-type operating system.

At step S106, the bytecode to be run is interpreted by using the interpreter to hot-update the code to be hot-updated.

Through the above steps, code to be hot-updated is translated into first-type intermediate code, wherein the first-type intermediate code is compiled by using a compiler of a target-type operating system; the first-type intermediate code is translated into bytecode to be run, wherein the bytecode to be run is interpreted by an interpreter of the target-type operating system; and the bytecode to be run is interpreted by using the interpreter to hot-update the code to be hot-updated. That is to say, the code to be hot-updated is translated into the first-type intermediate code compiled by using the compiler of the target-type operating system, and the first-type intermediate code is translated into the bytecode to be run, which is interpreted by the interpreter of the target-type operating system, so that the bytecode to be run is interpreted by using the interpreter, and the aim of hot update of a code can be quickly achieved without code conversion, thereby the technical effect of improving the hot update efficiency of the code can be achieved, and the technical problem of low execution efficiency caused by type conversion between a C# code and a scripting language LUA during the hot update of the C# code in the related art can be solved.

In the method provided in step S102, the code to be hot-updated may be C# code, C++ code, OBJECTIVE-C code, SWIFT code, RUST code, etc. The type of the code to be hot-updated in the embodiments of the present disclosure is not specifically limited. In the present disclosure, the code to be hot-updated is exemplified by the C# code herein.

It should be noted that the method of acquiring the code to be hot-updated in the embodiments of the present disclosure is not specifically limited.

Optionally, before the code to be hot-updated is translated into the first-type intermediate code, the embodiment of the present disclosure may also firstly acquire code to be hot-updated, and may include the following steps.

A target application to be updated installed in the target-type operating system is determined.

All or part of code of the target application to be updated is determined as the code to be hot-updated.

For the above steps, it should be noted that the target-type operating system may be an iOS operating system, an ANDROID operating system, a WINDOWS operating system, etc. The target-type operating system is not specifically limited in the embodiments of the present disclosure. The target-type operating system is exemplified by the iOS operating system herein. It also should be noted that at least one application may be installed in the target-type operating system. the type of the at least one application is not specifically limited in the embodiments of the present disclosure, which may be, for example, a game application, an instant messaging application, a browser application, etc.

The at least one application may include a target application to be updated. The type of the target application to be updated is not specifically limited in the embodiments of the present disclosure, which may be, for example, a game application, an instant messaging application, a browser application, etc.

Optionally, the target application includes code corresponding to at least one logical functions. The update for the target application may include, but is not limited to, the code is modified corresponding to the at least one logical function in the target application, the code is added corresponding to the at least one logical function in the target application, the code is deleted corresponding to the at least one logical function in the target application, etc.

Optionally, after the target application to be updated is determined, part or all of the code in the target application is determined as the code to be hot-updated according to content that needs to be updated by the target application in the embodiments of the present disclosure. For example, if only one logical function needs to be updated in the target application, the code corresponding to the logical function that needs to be updated may be determined as the code to be hot-updated.

The aim of acquiring the code to be hot-updated may be achieved in the embodiments of the present disclosure. In an actual application scene, the code to be hot-updated in the embodiments of the present disclosure may be also acquired in other methods, which are not illustrated herein.

After the code to be hot-updated is acquired, the code to be hot-updated is translated into first-type intermediate code. The first-type intermediate code may be compiled by a compiler of the target-type operating system. For example, the target-type operating system is an iOS system, and the first-type intermediate code may be intermediate code of a Low Level Virtual Machine (LLVM).

Optionally, step S102 of code to be hot-updated is translated into first-type intermediate code may include the following steps.

The code to be hot-updated is compiled into third-type intermediate code, wherein the third-type intermediate code is intermediate code of C# language.

The third-type intermediate code is translated into third language, wherein the third language is the C++ language.

The third language is compiled into the first-type intermediate code.

It should be noted that through the above steps, the aim of translating the code to be hot-updated into the first-type intermediate code can be achieved.

In an optional example, the code to be hot-updated may be C# code. The C# language in the embodiments of the present disclosure may be compiled into an intermediate code IL (that is, the third-type intermediate code) of the C# language by using a C# language compiler Mono. Then, the intermediate code IL may be translated into C++98 (that is, third language) by using IL2CPP. Furthermore, the C++98 may be compiled into an LLVM intermediate code (that is, the first-type intermediate code) by using a C++ compiler Clang.

It should be noted that compiler tools used in the above optional example are not limited to the above example, and other compiler tools may be used in the present disclosure as well, and are not illustrated herein. It also should be noted that the translation of the C# code into the LLVM intermediate code may also be performed in other methods, which are not illustrated herein.

The embodiments of the present disclosure may achieve the aim of compiling the code to be hot-updated by translating the code to be hot-updated into the first-type intermediate code, which is compiled by using the compiler of the target-type operating system, thereby the technical effect of improving the hot update efficiency of a code is achieved.

In the method provided in step S104, after the code is translated to be hot-updated into the first-type intermediate code, the first-type intermediate code may be translated into the bytecode to be run, wherein the bytecode to be run may be interpreted by the interpreter of the target-type operating system, to facilitate hot update of the code to be hot-updated by interpreting the bytecode to be run by the interpreter.

Optionally, step S104 of translating the first-type intermediate code into bytecode to be run may include the following steps.

The first-type intermediate code is translated into first language, wherein the first language is a subset of C++ language.

The first language is translated into second-type intermediate code, wherein the second-type intermediate code is used for optimizing the first language.

The second-type intermediate code is translated into second language, wherein the second language is a subset of a Central Processing Unit (CPU) instruction set.

The second language is translated into the bytecode to be run.

It should be noted that through the above steps, the aim of translating the first-type intermediate code into the bytecode to be run can be achieved.

In an optional example, the code to be hot-updated may be C# code, and the C# code may be translated into an LLVM intermediate code (that is, first-type intermediate code) by step S102. Then, the LLVM intermediate code may be translated into first language, wherein the first language may be a subset of C++ language, that is to say, the first language may be a simplified version of the C++ language. Therefore, a standard C++ compiler may be used for compiling, wherein the standard C++ compiler may be VC++, G++, Clang, etc., and there is no limitation herein. The LLVM intermediate code is translated into the first language, for the reason that the LLVM intermediate code is not a language suitable for direct interpretation. Furthermore, the first language may be translated into second-type intermediate code. Optionally, the second-type intermediate code may be a LISP (computer programming language) intermediate code, wherein the LISP intermediate code may be used for optimizing the first language, which may include, but is not limited to, limiting the size of a text in the first language and increasing the speed of code execution of the first language. Then, the LISP intermediate code may be translated into second language, wherein the second language may be a subset of X64, the X64 may be a instruction set of low level CPU, and the second language may be a simplified version of X64. Last, the second language may be translated into bytecode to be run, wherein the bytecode to be run may be interpreted by an interpreter of the iOS operating system to implement hot update of the C# code.

It should be noted that compiler tools used in the above optional example are not limited to the above, and other compiler tools may be used in the present disclosure as well, which are not illustrated herein. It also should be noted that the translation of the first-type intermediate code into the bytecode to be run may also be performed in other methods, which are not illustrated herein.

In the embodiments of the present disclosure, the code to be hot-updated is translated into the first-type intermediate code compiled by using the compiler of the target-type operating system, and then the first-type intermediate code is translated into the bytecode to be run, which is interpreted by the interpreter of the target-type operating system, so that the bytecode to be run is interpreted by the interpreter, the aim of hot update of the code to be hot-updated is achieved, and type conversion between C# code and a scripting language LUA during the hot update of the C# code is avoided, thereby achieving the technical effect of improving the hot update efficiency of the code.

In the method provided in step S106, after the bytecode to be run is acquired, the bytecode to be run may be interpreted by the interpreter in the target-type operating system to achieve the aim that hot update of the code to be hot-updated.

It should be noted that in the present embodiment, since the intermediate code is completely translated, the interpreter of the embodiments of the present disclosure may run the type intermediate code, regardless of the version language, as long as the version language can be translated into intermediate code. The hot update of C# code can be achieved.

In an optional example, the code to be hot-updated may be C# code, and the C# code may be translated into an LLVM intermediate code (that is, the first-type intermediate code) through step S102. By means of step S104, the LLVM intermediate code may be translated into bytecode to be run. Then, the bytecode to be run is interpreted by the interpreter to achieve hot update of the C# code.

The embodiments of the present disclosure may be applied to scene in which the C# code is hot-updated.

Figure 2:
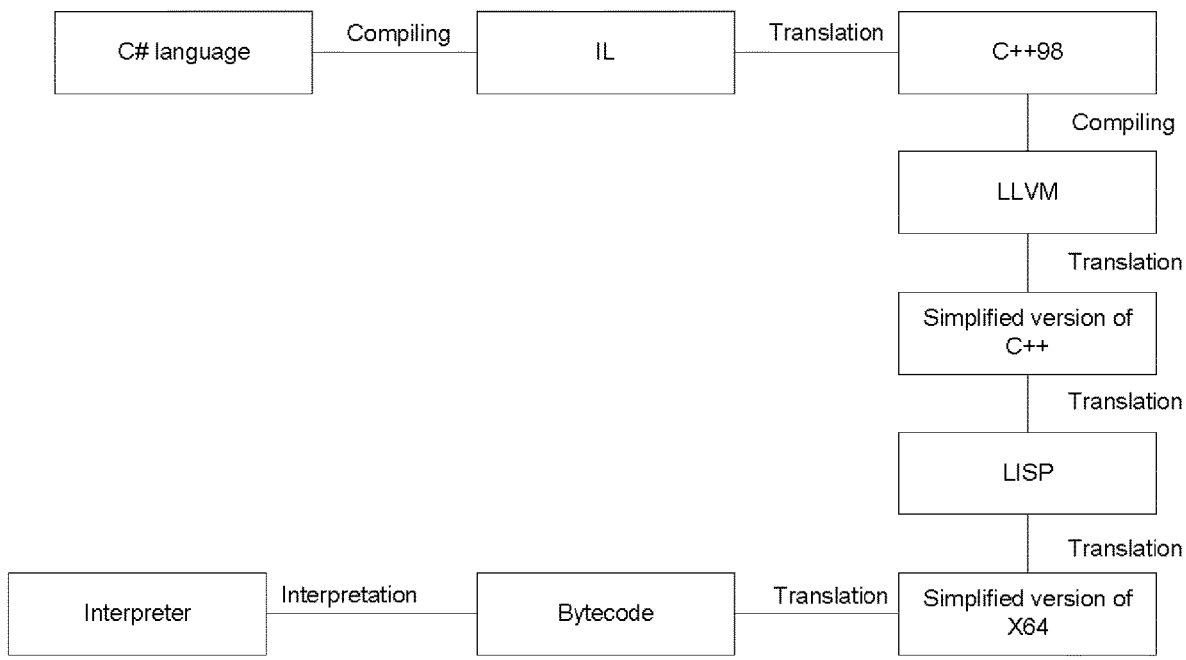
FIG. 2 is a schematic diagram of hot update of a C# code according to one embodiment of the present disclosure.

FIG. 2 is a schematic diagram of hot update of a C# code according to one embodiment of the present disclosure. As shown in FIG. 2, in order to achieve hot update of the C# code, the C# code may be compiled into an intermediate code IL (that is, third-type intermediate code) of C# language by using a compiler Mono of the C# language. The intermediate code IL is translated into C++98 (that is, third language) by using IL2CPP. The C++98 is translated into an LLVM intermediate code (that is, first-type intermediate code) by using a C++ compiler Clang. The LLVM intermediate code is translated into a simplified version of C++, which is referred to as C++ Light (equivalent to first language in the above embodiment), wherein the C++ Light may be a subset of C++ language. Therefore, a standard C++ compiler may be used for compiling. For example, the standard C++ compiler may be VC++, G++, Clang, etc. In the case that the first-type intermediate code is not suitable for direct interpretation, the first-type intermediate code is translated into the first language. For example, the LLVM intermediate code is not a language suitable for direct interpretation, and then the LLVM intermediate code is translated into the C++ Light. Then, the C++ Light may be translated into LISP (that is, second-type intermediate code), wherein the LISP may be used for optimizing the first language. The LISP is translated into a simplified version of X64 (that is, second language), referred to herein as X64 Light. Then, the X64 Light is translated into bytecode to be run. Finally, the bytecode to be run is interpreted by an interpreter to achieve hot update of the C# code, therefore type conversion between the C# code and a scripting language LUA during the hot update of the C# code is avoided, the technical effect of improving the hot update efficiency of the code is achieved.

Through the above series of compilation and translation, the interpretation of the C# code is achieved, that is, the hot update of the C# code is achieved.

It should be noted that the method in the embodiments of the present disclosure are compatible with C++98 (that is, third language) and C++ 11, and are also compatible with C#2.0, C#3.0, and C#4.0. As LLVM is completely translated in the embodiments of the present disclosure, and the interpreter of the embodiments of the present disclosure may run the LLVM, regardless of the version language, as long as the version language can be translated into the LLVM. Therefore The hot update of a C# code can be achieved.

The core of the embodiments of the present disclosure is to implement a complete set of interpreters, and to acquire bytecode to be run that is convenient for efficient execution of an ARM by a series of translations and conversions of the C# code, and by interpreting the bytecode to be run by using the interpreter, thereby achieving hot update of the C# code.

The embodiments of the present disclosure have the following advantages.

1. Performance of the method in the embodiments of the present disclosure is high. The method is not involved with dynamic memory allocation, and may use a static type, and support a Foreign Language Interface (FFI), that is, an interface for calling a language in another language, and LLVM performs various optimizations.

2. Consistency of the method in the embodiments of the present disclosure is high. The method is only involved with the C# language and do not involved with the second language.

According to the embodiments of the present disclosure, a device embodiment of a code hot-update device is further provided. It should be noted that the code hot-update device may be used for performing the code hot-update method in the embodiments of the present disclosure. That is, the code hot-update method in the embodiments of the present disclosure may be performed in the code hot-update device.

Figure 3:
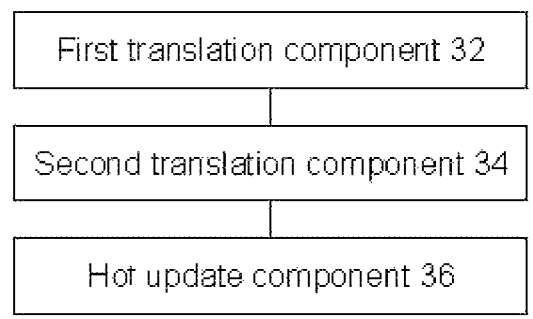
FIG. 3 is a schematic diagram of a code hot-update device according to one embodiment of the present disclosure.

FIG. 3 is a schematic diagram of a code hot-update device according to one embodiment of the present disclosure. As shown in FIG. 3, the code hot-update device includes at least one processor, and at least one memory for storing a program element, wherein the program element is executed by the at least one processor, and the program element may include a first translation component 32, a second translation component 34 and a hot update component 36.

The first translation component 32 is configured to translate code to be hot-updated into first-type intermediate code, wherein the first-type intermediate code is compiled by using a compiler of a target-type operating system. The second translation component 34 is configured to translate the first-type intermediate code into bytecode to be run, wherein the bytecode to be run is interpreted by an interpreter of the target-type operating system. The hot update component 36 is configured to interpret the bytecode to be run by using the interpreter to hot-update the code to be hot-updated.

It should be noted that the first translation component 32, the second translation component 34 and the hot update component 36 may be run in a terminal as part of a device. The functions implemented by the above components may be executed by at least one processor in the terminal. The terminal may also be a smart phone (such as an ANDROID phone or an iOS phone), a tablet computer, a palmtop, a Mobile Internet Device (MID), a PAD, or other terminal devices.

It should be noted that the first translation component 32 in the present embodiment may be configured to perform step S102 in the embodiments of the present disclosure. The second translation component 34 in the present embodiment may be configured to perform step S104 in the embodiments of the present disclosure. The hot update component 36 in the present embodiment may be configured to perform step S106 in the embodiments of the present disclosure. The above components are the same as the examples and application scene implemented by the corresponding steps, but are not limited to the contents disclosed in the above embodiments.

Optionally, the second translation component 34 may include: a first translation component, configured to translate the first-type intermediate code into first language, wherein the first language is a subset of C++ language; a second translation component, configured to translate the first language into second-type intermediate code, wherein the second-type intermediate code is used for optimizing the first language; a third translation component, configured to translate the second-type intermediate code into second language, wherein the second language is a subset of a CPU instruction set; and a fourth translation component, configured to translate the second language into the bytecode to be run.

It should be noted that the first translation component, the second translation component, the third translation component and the fourth translation component may be run in a terminal as part of the device, and the functions implemented by the above components may be executed by the at least one processor in the terminal.

It should be noted that the first translation component in the present embodiment may be configured to perform a step that the first-type intermediate code is translated into the first language, wherein the first language is a subset of C++ language in the embodiments of the present disclosure. The second translation component in the present embodiment may be configured to perform a step that the first language is translated into the second-type intermediate code, wherein the second-type intermediate code is used for optimizing the first language in the embodiments of the present disclosure. The third translation component in the present embodiment may be configured to perform a step that the second-type intermediate code is translated into the second language, wherein the second language is the subset of the Central Processing Unit (CPU) instruction set in the embodiments of the present disclosure. The fourth translation component in the present embodiment may be configured to perform a step that the second language is translated into the bytecode to be run in the embodiments of the present disclosure. The above components are the same as the examples and application scene implemented by the corresponding steps, but are not limited to the contents disclosed in the above embodiments.

Optionally, the first translation component 32 may include: a first compiling component, configured to compile the code to be hot-updated into third-type intermediate code, wherein the third-type intermediate code is intermediate code of C# language; a fifth translation component, configured to translate the third-type intermediate code into third language, wherein the third language is the C++ language; and a second compiling component, configured to compile the third language into the first-type intermediate code.

It should be noted that the first compiling component, the fifth translation component and the second compiling component may be run in a terminal as part of the device, and the functions implemented by the above component s may be executed by the at least one processor in the terminal.

It should be noted that the first compiling component in the present embodiment may be configured to perform a step that the code to be hot-updated is compiled into the third-type intermediate code, wherein the third-type intermediate code is the intermediate code of C# language in the embodiments of the present disclosure. The fifth translation component in the present embodiment may be configured to perform a step that the third-type intermediate code is translated into the third language, wherein the third language is the C++ language in the embodiments of the present disclosure. The second compiling component in the present embodiment may be configured to perform a step that the third language is compiled into the first-type intermediate code in the embodiments of the present disclosure. The above components are the same as the examples and application scene implemented by the corresponding steps, but are not limited to the contents disclosed in the above embodiments.

Optionally, the code hot-update device may further include: a first determination module, configured to determine, before translating the code to be hot-updated into the first-type intermediate code, a target application to be updated installed in the target-type operating system; and a second determination component, configured to determine all or part of code of the target application to be updated as the code to be hot-updated.

It should be noted that the first determination component and the second determination component may be run in a terminal as part of the device, and the functions implemented by the above components may be executed by a processor in the terminal.

It should be noted that the first determination component in the present embodiment may be configured to perform a step that the target application to be updated installed in the target-type operating system is determined in the embodiments of the present disclosure. The second determination component in the present embodiment may be configured to perform a step that all or part of code of the target application to be updated is determined as the code to be hot-updated in the embodiments of the present disclosure. The above modules are the same as the examples and application scene implemented by the corresponding steps, but are not limited to the contents disclosed in the above embodiments.

In order to achieve the above objective, according to another aspect of the present disclosure, the embodiments of the present disclosure also provide a non-transitory storage medium. The non-transitory storage medium includes a stored program, on which at least one computer program is stored, the at least one computer program being executed by a processor. The program is run to control a device where the non-transitory storage medium is located to perform the code hot-update method.

The various functional components provided by the embodiments of the present application may be run in a code hot-update device or a similar computation device, or may be stored as part of the non-transitory storage medium.

Optionally, in the present embodiment, a computer program is stored in the non-transitory storage medium, wherein the computer program is configured to be run to perform the code hot-update method.

Figure 4:
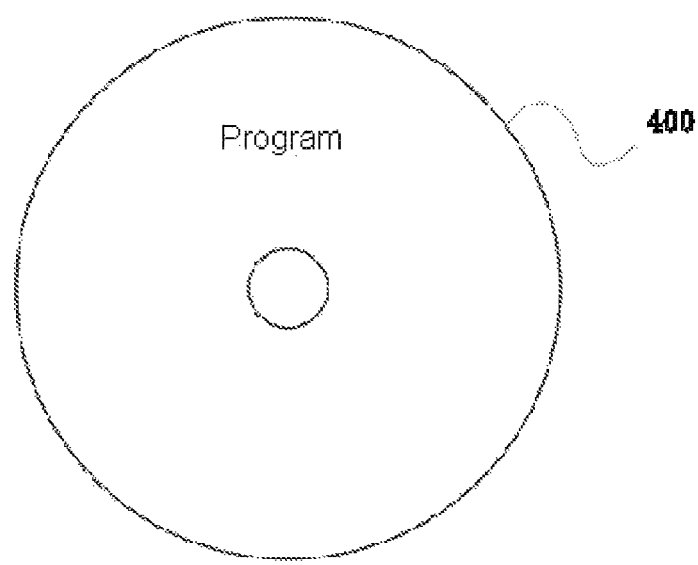
FIG. 4 is a structure schematic diagram of a storage medium according to one embodiment of the present disclosure.

FIG. 4 is a structure schematic diagram of a storage medium according to one embodiment of the present disclosure. As shown in FIG. 4, a program product 400 according to an implementation manner of the present disclosure is described. A computer program is stored thereon. When being executed by a processor, the computer program has program code implementing the following steps:

Code to be hot-updated is translated into first-type intermediate code, wherein the first-type intermediate code is compiled by using a compiler of a target-type operating system.

The first-type intermediate code is translated into bytecode to be run, wherein the bytecode to be run is interpreted by an interpreter of the target-type operating system.

The bytecode to be run is interpreted by using the interpreter to hot-update the code to be hot-updated.

Optionally, the computer program is executed by the processor to implement program code for the following steps.

The first-type intermediate code is translated into first language, wherein the first language is a subset of C++ language.

The first language is translated into second-type intermediate code, wherein the second-type intermediate code is used for optimizing the first language.

The second-type intermediate code is translated into second language, wherein the second language is a subset of a CPU instruction set.

The second language is translated into the bytecode to be run.

Optionally, the computer program is executed by the processor to implement program code for the following steps.

The code to be hot-updated is compiled into third-type intermediate code, wherein the third-type intermediate code is intermediate code of C# language.

The third-type intermediate code is translated into third language, wherein the third language is the C++ language.

The third language is compiled into the first-type intermediate code.

Optionally, the computer program is executed by the processor to implement program code for the following steps.

Before the code to be hot-updated is translated into first-type intermediate code, a target application to be updated installed in the target-type operating system is determined.

All or part of code of the target application to be updated are determined as the code to be hot-updated.

By means of the above implementation method, the code to be hot-updated is translated into the first-type intermediate code compiled by using the compiler of the target-type operating system, and the first-type intermediate code is translated into the bytecode to be run, which is interpreted by the interpreter of the target-type operating system, so that the bytecode to be run is interpreted by using the interpreter, and the aim of hot update of a code can be quickly achieved without code conversion, thereby the technical effect of improving the hot update efficiency of the code is achieved, and the technical problem of low execution efficiency caused by type conversion between a C# code and a scripting language LUA during the hot update of the C# code in the related art is solved.

Optionally, a specific example in the present embodiments may refer to the examples described in the above embodiments, and details are not described herein in the present embodiment.

The transitory computer-readable storage medium may include a data signal that is propagated in a baseband or as part of a carrier, carrying readable program code. Such propagated data signals may take a variety of forms including, but not limited to, electromagnetic signals, optical signals, or any suitable combination of the foregoing. The transitory computer-readable storage medium may send, propagate, or transmit a program for use by or in connection with an instruction execution system, device or apparatus.

Program code included in the non-transitory computer-readable storage medium may be transmitted by any suitable medium, including but not limited to wireless, wire, optical cable, radio frequency, etc., or any suitable combination of the foregoing.

Optionally, in the present embodiment, the non-transitory storage medium may also be configured to store program code for determining various preferred or optional method steps provided by the code hot-update method.

In order to achieve the above objective, according to another aspect of the present disclosure, the embodiment of the present disclosure also provides a processor.

Figure 5:
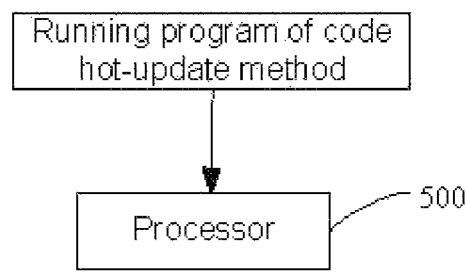
FIG. 5 is a structure schematic diagram of a processor according to one embodiment of the present disclosure.

FIG. 5 is a structure schematic diagram of a processor according to one embodiment of the present disclosure. As shown in FIG. 5, the processor 500 is configured to run a program. The program is run to perform the above code hot-update method.

In the embodiment of the disclosure, the processor may execute a running program of the code hot-update method.

The processor may be configured to perform the following steps.

Code to be hot-updated is translated into first-type intermediate code, wherein the first-type intermediate code is compiled by using a compiler of a target-type operating system.

The first-type intermediate code is translated into bytecode to be run, wherein the bytecode to be run is interpreted by an interpreter of the target-type operating system.

The bytecode to be run is interpreted by using the interpreter to hot-update the code to be hot-updated.

Optionally, the processor may also be configured to perform the following steps.

The first-type intermediate code is translated into first language, wherein the first language is a subset of C++ language.

The first language is translated into second-type intermediate code, wherein the second-type intermediate code is used for optimizing the first language.

The second-type intermediate code is translated into second language, wherein the second language is a subset of a CPU instruction set.

The second language is translated into the bytecode to be run.

Optionally, the processor may also be configured to perform the following steps.

The code to be hot-updated is compiled into third-type intermediate code, wherein the third-type intermediate code is intermediate code of C# language.

The third-type intermediate code is translated into third language, wherein the third language is the C++ language.

The third language is compiled into the first-type intermediate code.

Optionally, the processor may also be configured to perform the following steps.

Before the code to be hot-updated is translated into the first-type intermediate code, a target application to be updated installed in the target-type operating system is determined.

All or part of code of the target application to be updated are determined as the code to be hot-updated.

By means of the above implementation method, the code to be hot-updated is translated into the first-type intermediate code compiled by using the compiler of the target-type operating system, and the first-type intermediate code is translated into the bytecode to be run, which is interpreted by the interpreter of the target-type operating system, so that the bytecode to be run is interpreted by using the interpreter, and the aim of hot update of a code can be quickly achieved without code conversion, thereby the technical effect of improving the hot update efficiency of the code is achieved, and the technical problem of low execution efficiency caused by type conversion between a C# code and a scripting language LUA during the hot update of the C# code in the related art solved.

The processor may execute various function applications and data processing by running application programs and components stored in the memory. That is, the code hot-update method is implemented.

Those of ordinary skill in the art can understand that all or part of the steps in various methods of the above embodiments may be completed by a program to indicate the related hardware of the code hot-update device. The program may be stored in a non-transitory storage medium for determining the code hot-update device. The non-transitory storage medium may include a flash disk, a Read-Only Memory (ROM), a Random Access Memory (RAM), a magnetic disk or an optical disk, and the like.

The code hot-update method and device, the storage medium, the processor, and the terminal according to the present disclosure are described as above by way of example with reference to the accompanying drawings. However, those skilled in the art should understand that various improvements can be made to the code hot-update method and device, the storage medium, the processor, and the terminal proposed in the present disclosure, without departing from the content of the present disclosure. Therefore, the scope of protection of the present disclosure should be determined by the content of the appended claims.

To achieve the above objective, according to another aspect of the present disclosure, a terminal is also provided in the embodiments of the present disclosure. The terminal includes at least one memory and at least one processor. The at least one memory stores at least one computer program. The processor is configured to run the computer program to perform the above code hot-update method.

Figure 6:
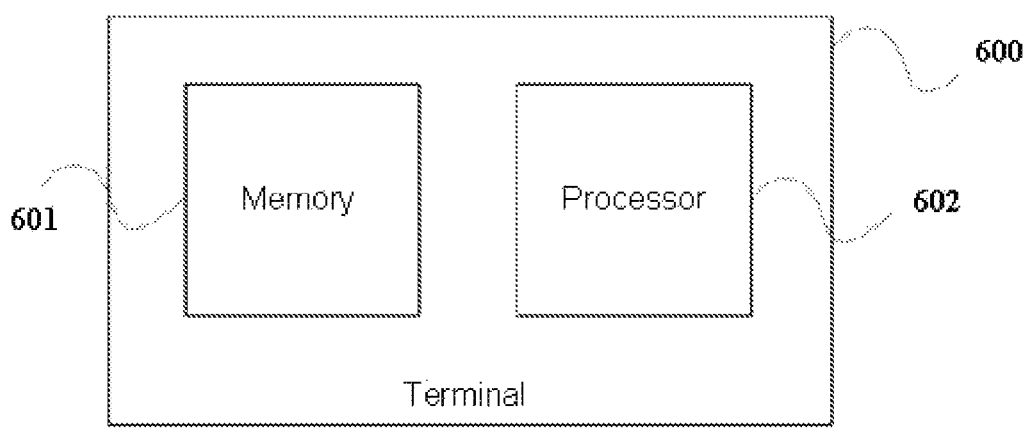
FIG. 6 is a structure schematic diagram of a terminal according to one embodiment of the present disclosure.

FIG. 6 is a structure schematic diagram of a terminal according to one embodiment of the present disclosure. As shown in FIG. 6, a terminal 600 of the present embodiment includes: a memory 601 and a processor 602. The memory 601 is configured to store at least one executable instruction of the processor. The at least one executable instruction may be the at least one computer program. The processor 602 is configured to execute the at least one executable instruction to perform the following steps.

Code to be hot-updated is translated into first-type intermediate code, wherein the first-type intermediate code is compiled by using a compiler of a target-type operating system.

The first-type intermediate code is translated into bytecode to be run, wherein the bytecode to be run is interpreted by an interpreter of the target-type operating system.

The bytecode to be run is interpreted by using the interpreter to hot-update the code to be hot-updated.

Optionally, the processor 602 is also configured to execute the executable instruction to implement the following steps.

The first-type intermediate code is translated into first language, wherein the first language is a subset of C++ language.

The first language is translated into second-type intermediate code, wherein the second-type intermediate code is used for optimizing the first language.

The second-type intermediate code is translated into second language, wherein the second language is a subset of a CPU instruction set.

The second language is translated into the bytecode to be run.

Optionally, the processor 602 is also configured to execute the executable instruction to implement the following steps.

The code to be hot-updated is compiled into third-type intermediate code, wherein the third-type intermediate code is intermediate code of C# language.

The third-type intermediate code is translated into third language, wherein the third language is the C++ language.

The third language is compiled into the first-type intermediate code.

Optionally, the processor 602 is also configured to execute the executable instruction to implement the following steps.

Before the code is translated to be hot-updated into the first-type intermediate code, a target application to be updated installed in the target-type operating system is determined.

All or part of code of the target application to be updated are determined as the code to be hot-updated.

By means of the above implementation method, the code to be hot-updated is translated into the first-type intermediate code compiled by using the compiler of the target-type operating system, and the first-type intermediate code is translated into the bytecode to be run, which is interpreted by the interpreter of the target-type operating system, so that the bytecode to be run is interpreted by using the interpreter, and the aim of hot update of a code can be quickly achieved without code conversion, thereby the technical effect of improving the hot update efficiency of the code is achieved, and the technical problem of low execution efficiency caused by type conversion between a C# code and a scripting language LUA during the hot update of the C# code in the related art is solved.

In an alternative implementation method, the terminal may further include at least one processor, and a memory resource represented by the memory and configured to store an instruction executable by a processing component, such as an application program. The application program stored in the memory may include at least one components each corresponding to a set of instructions. In addition, the processing component is configured to execute instructions to perform the above-described information processing method.

The terminal may also include: a power supply component, configured to perform power management on the electronic device; a wired or wireless network interface, configured to connect the electronic device to a network; and an input output (I/O) interface. The electronic device may operate based on an operating system stored in the memory, such as ANDROID, iOS, WINDOWS, MAC OS X, UNIX, LINUX, FREEBSD, or the like.

It can be understood by those of ordinary skill in the art that the structure shown in FIG. 6 is merely illustrative. The terminal may be an electronic device such as a smart phone, a tablet computer, a palmtop computer, an MID, or a PAD. FIG. 6 does not limit the structure of the above terminal. For example, the terminal may also include more or fewer components (such as a network interface or a display device) than shown in FIG. 6, or has a different configuration from that shown in FIG. 6.

The above serial numbers of the embodiments of the present disclosure are merely for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are merely illustrative. For example, the division of the component may be a logical function division. In actual implementation, there may be another division manner, for example, multiple components may be combined or integrated into another system, or some features may be ignored or not executed. In addition, the coupling or direct coupling or communication connection shown or discussed may be an indirect coupling or communication connection through some interfaces and components, and may be electrical or otherwise.

The components described as separate components may or may not be physically separated, and the members displayed as components may or may not be physical components, that is, may be located in one place, or may be distributed to multiple components. Some or all of the components may be selected according to actual needs to achieve the purpose of the solution of the present embodiment.

In addition, each functional component in each embodiment of the present disclosure may be integrated into one processing component, or each component may exist physically separately, or two or more components may be integrated into one component. The integrated component may be implemented in a hardware form and may also be implemented in form of software functional component.

The integrated component may be stored in a computer-readable storage medium if being implemented in the form of a software functional component and sold or used as a standalone product. Based on such understanding, the technical solution of the present disclosure, which is essential or contributes to the related art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above is a preferred implementation of the present disclosure. It is to be noted that a number of modifications and refinements may be made by those of ordinary skill in the art without departing from the principles of the present disclosure, and such modifications and refinements are also considered to be within the scope of protection of the present disclosure.

INDUSTRIAL APPLICABILITY

Code to be hot-updated is translated into first-type intermediate code, wherein the first-type intermediate code is compiled by using a compiler of a target-type operating system; the first-type intermediate code is translated into bytecode to be run, wherein the bytecode to be run being interpreted by an interpreter of the target-type operating system; and the bytecode to be run is interpreted by using the interpreter to hot-update the code to be hot-updated. The aim of hot update of a code can be quickly achieved without code conversion, thereby the technical effect of improving the hot update efficiency of the code is achieved, and the technical problem of low execution efficiency caused by type conversion between a C# code and a scripting language LUA during the hot update of the C# code in the related art is solved.

It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It should be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

It should be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

What is claimed is:

1. A code hot-update method, comprising:
   translating code to be hot-updated into first-type intermediate code, wherein the first-type intermediate code is compiled by using a compiler of a target-type operating system, and the code to be hot-updated is installed in the target-type operating system;
   translating the first-type intermediate code into bytecode to be run, wherein the bytecode to be run is interpreted by an interpreter of the target-type operating system; and
   interpreting the bytecode to be run by using the interpreter to hot-update the code to be hot-updated;
   wherein translating the first-type intermediate code into the bytecode to be run comprises:
   translating the first-type intermediate code into first language, wherein the first language is a subset of C++ language;
   translating the first language into second-type intermediate code, wherein the second-type intermediate code is a LISP intermediate code and used for limiting a size of a text in the first language and/or increasing a speed of code execution of the first language;
   translating the second-type intermediate code into second language, wherein the second language is a subset of a Central Processing Unit (CPU) instruction set; and
   translating the second language into the bytecode to be run.

2. The method as claimed in claim 1, wherein translating the code to be hot-updated into the first-type intermediate code comprises:
   compiling the code to be hot-updated into third-type intermediate code, wherein the third-type intermediate code is intermediate code of C# language;
   translating the third-type intermediate code into third language, wherein the third language is the C++ language; and
   compiling the third language into the first-type intermediate code.

3. The method as claimed in claim 2, wherein the third-type intermediate code is an intermediate code IL.

4. The method as claimed in claim 2, wherein the third language is C++98.

5. The method as claimed in claim 2, wherein translating the third-type intermediate code into the third language comprises:
   translating the third-type intermediate code into the third language by using IL2CPP.

6. The method as claimed in claim 2, wherein compiling the third language into the first-type intermediate code comprise:
   translating the third language into the first-type intermediate code by using a C++ compiler Clang.

7. The method as claimed in claim 1, wherein before translating the code to be hot-updated into the first-type intermediate code, the method further comprises:
   determining a target application to be updated installed in the target-type operating system, wherein the target application comprises one of the followings: a game application, an instant messaging application and a browser application; and
   determining all or part of code of the target application to be updated as the code to be hot-updated.

8. The method as claimed in claim 7, wherein the target application comprises code corresponding to at least one logical function, and determining all or part of code of the target application to be updated as the code to be hot-updated comprises at least one of the following steps:
   modifying the code corresponding to the at least one logical function in the target application;
   adding the code corresponding to the at least one logical functions in the target application;
   deleting the code corresponding to the at least one logical functions in the target application.

9. The method as claimed in claim 1, wherein the first-type intermediate code is intermediate code of a Low Level Virtual Machine.

10. The method as claimed in claim 1, wherein the second language is a simplified version of X64.

11. A non-transitory storage medium, on which at least one computer program is stored, the at least one computer program being executed by a processor to implement the following steps:
    translating code to be hot-updated into first-type intermediate code, wherein the first-type intermediate code is compiled by using a compiler of a target-type operating system, and the code to be hot-updated is installed in the target-type operating system;
    translating the first-type intermediate code into bytecode to be run, wherein the bytecode to be run is interpreted by an interpreter of the target-type operating system; and
    interpreting the bytecode to be run by using the interpreter to hot-update the code to be hot-updated;
    wherein translating the first-type intermediate code into the bytecode to be run comprises:
    translating the first-type intermediate code into first language, wherein the first language is a subset of C++ language;
    translating the first language into second-type intermediate code, wherein the second-type intermediate code is a LISP intermediate code and used for limiting a size of a text in the first language and/or increasing a speed of code execution of the first language;

translating the second-type intermediate code into second language, wherein the second language is a subset of a Central Processing Unit (CPU) instruction set; and translating the second language into the bytecode to be run.

12. The non-transitory storage medium according to claim 11, wherein the at least one computer program being executed by the processor to further implement the following steps:

compiling the code to be hot-updated into third-type intermediate code, wherein the third-type intermediate code is intermediate code of C# language;

translating the third-type intermediate code into third language, wherein the third language is the C++ language; and compiling the third language into the first-type intermediate code.

13. The non-transitory storage medium according to claim 11, wherein the at least one computer program being executed by the processor to further implement the following steps:

determining, before translating code to be hot-updated into first-type intermediate code, a target application to be updated installed in the target-type operating system, wherein the target application comprises one of the followings: a game application, an instant messaging application and a browser application; and determining all or part of code of the target application to be updated as the code to be hot-updated.

14. A terminal, comprising at least one memory and at least one processor, wherein the at least one memory stores at least one computer program, and the processor is configured to run the at least one computer program to perform the following steps:

translating code to be hot-updated into first-type intermediate code, wherein the first-type intermediate code is compiled by using a compiler of a target-type operating system, and the code to be hot-updated is installed in the target-type operating system;

translating the first-type intermediate code into bytecode to be run, wherein the bytecode to be run is interpreted by an interpreter of the target-type operating system; and interpreting the bytecode to be run by using the interpreter to hot-update the code to be hot-updated;

wherein translating the first-type intermediate code into the bytecode to be run comprises:

translating the first-type intermediate code into first language, wherein the first language is a subset of C++ language;

translating the first language into second-type intermediate code, wherein the second-type intermediate code is a LISP intermediate code and used for limiting a size of a text in the first language and/or increasing a speed of code execution of the first language;

translating the second-type intermediate code into second language, wherein the second language is a subset of a Central Processing Unit (CPU) instruction set; and translating the second language into the bytecode to be run.

15. The terminal as claimed in claim 14, wherein the processor is also configured to run the at least one computer program to perform the following steps:

compiling the code to be hot-updated into third-type intermediate code, wherein the third-type intermediate code is intermediate code of C# language;

translating the third-type intermediate code into third language, wherein the third language is the C++ language; and compiling the third language into the first-type intermediate code.

16. The terminal as claimed in claim 14, wherein the processor is also configured to run the at least one computer program to perform the following steps:

determining, before translating the code to be hot-updated into first-type intermediate code, a target application to be updated installed in the target-type operating system, wherein the target application comprises one of the followings: a game application, an instant messaging application and a browser application; and determining all or part of code of the target application to be updated as the code to be hot-updated.

* * * * *